Nov. 29, 1927.                M. H. WARD                1,650,917
                          LUBRICATING SYSTEM
                          Filed Feb. 25, 1926
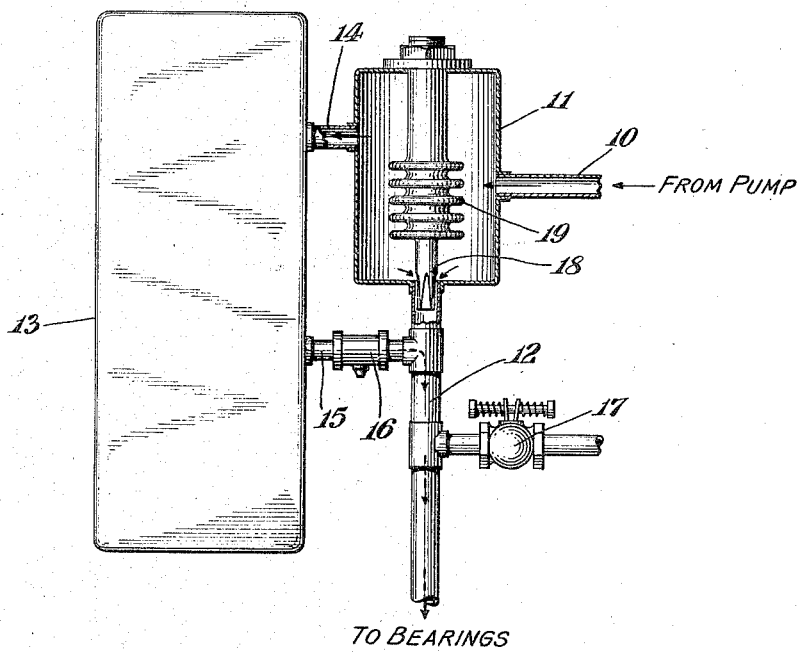
INVENTOR.
Marshall H. Ward
BY Kenyon & Kenyon
ATTORNEYS.

Patented Nov. 29, 1927.

1,650,917

UNITED STATES PATENT OFFICE.

MARSHALL H. WARD, OF BROOKLYN, NEW YORK, ASSIGNOR, BY MESNE ASSIGNMENTS, TO MOTOR IMPROVEMENTS, INC., OF NEWARK, NEW JERSEY, A CORPORATION OF DELAWARE.

LUBRICATING SYSTEM.

Application filed February 25, 1926. Serial No. 90,443.

This invention relates to lubricating systems and more especially to oil filtering systems adapted for use in connection with internal combustion engines.

In lubricating systems of this type oil is pumped from the crank case to the filter and thence to the bearings. The filter is so designed that after the engine to which it is connected has been running and the oil warmed up it will discharge a sufficient amount of oil to keep the bearings well lubricated. However, when the oil is cold as at the starting of the engine, its viscosity is too great to permit it to pass freely through the filter and as a consequence sufficient oil can not be supplied to the bearings through the filter. Also if the filter is prevented from operating at its normal capacity due to clogging or other reasons, the supply of oil from the filter will be insufficient for the bearings.

An object of this invention is a simple and efficient oil filtering system in which is assured the delivery to the bearings of a proper supply of oil.

One way of attaining this object is by providing communication between the oil supply and oil discharge lines exterior of the filter and controlling communication between these lines by a valve, the operation of which is dependent upon the condition of the oil in the supply line. In the supply line are provided means responsive to the temperature of the oil for operating the valve, the means being also responsive to changes in pressure in the oil. The valve controlling means is so designed that when the temperature of the oil is low and its viscosity excessive, as at the starting of the engine, the valve is open thereby permitting a direct flow of oil to the bearings and that when the oil has become warmed by being circulated through the engine, the valve is closed, thus directing the oil through the filter. This condition is maintained unless the pressure in the system becomes excessive due to the failure of the filter to operate at normal capacity because of the filter becoming clogged or any other reason. The valve control means is then responsive to the increase of pressure to cause the valve to open and permit direct flow of oil to the bearings. When the pressure becomes normal, the valve operating means causes the valve again to close. Thus if the pressure is excessive because of failure of the filter to function properly or if the temperature of the oil is such that it is excessively viscous, the valve is open thereby permitting direct flow to the bearings but if the pressure is normal and the temperature high enough that the oil is not excessively viscous, the valve is kept closed, thus directing the oil through the filter.

Other objects, novel features and advantages of this invention will be apparent from the following specification and accompanying drawing wherein the single figure illustrates one embodiment of the invention.

In the drawing the reference numeral 10 designates a pipe leading from the oil pump (not shown) to a chamber 11 from the bottom of which a pipe 12 leads to the bearings (not shown) to be lubricated. A filter 13 is connected to the chamber 11 by a pipe 14 and to the pipe 12 by a pipe 15 in which is provided an inspection valve 16. A pressure relief valve 17 is connected to the pipe 12.

The outlet from the chamber 11 to the pipe 12 is controlled by valve 18 arranged to cooperate with a seat in the end of the pipe 12. The valve 18 is operated by means of a thermostat 19 preferably of the bellows type, which is supported on the end of the chamber 11 opposite the port communicating with the pipe 12. This thermostat has hermetically sealed within it a charge of volatile fluid so chosen as to become completely vaporized at a predetermined temperature and when so vaporized exerts a definite pressure on the inside of the thermostat which pressure is effective to seat the valve 18, thereby closing the port between the chamber 11 and the pipe 12. At temperatures below the predetermined temperature the fluid within the bellows is liquid and of considerably less volume than the vapor. The bellows will consequently contract and withdraw the valve 18 from its seat, thus opening the port between the chamber 11 and the pipe 12. Thus when the oil is cold and consequently of such viscosity that it will not readily pass through the filter 13, the thermostat is contracted and oil will pass directly from the pipe 10 through the chamber 11 and the pipe 12 to the bearings. As the oil becomes warmed by being circulated through the engine the volatile fluid within the thermostat expands until ultimately the valve 18 closes the port between the chamber 11 and the pipe 12 thereby compelling the oil to pass through the filter 13 and out through the pipe 15 to the pipe 12.

The volatile liquid is so chosen that at a predetermined temperature, for example, 90° F., it will have become completely vaporized. Any increase in temperature thereafter will result merely in superheating the vapor and will produce little or no increase in pressure. The amount of volatile liquid contained within the thermostat 19 is such that the pressure exerted by it when completely vaporized is slightly in excess of the pressure of the oil in the system when the filter 13 is operating at normal capacity so that unless this pressure is exceeded the valve 18 remains seated. So long at the pressure of the oil within the chamber 11 does not exceed the pressure within the thermostat the valve 18 will remain in position to prevent flow of oil from the chamber 11 to the pipe 12. However, if the pressure of the oil within the chamber 11 exceeds the pressure within the thermostat 19 the oil pressure will cause the thermostat to collapse thereby withdrawing the valve 18 from its seat and permitting oil to flow directly from the chamber 11 to the pipe 12. This increase of pressure of the oil within the chamber 11 may be due to the inability of the filter 13 to function at normal capacity because of clogging or some other reason.

Thus when the oil is excessively viscous because of low temperature or when the pressure in the supply line is excessive because of the failure of the filter to function normally, the filter is cut out of the system and the oil permitted to pass directly from the pump to the bearings, thus insuring a proper supply of oil, either filtered or unfiltered, to the bearings at all times.

It is of course understood that while the above described arrangement is the preferred embodiment of the invention, various structural modifications may be made without in any way departing from the spirit of the invention as set forth in the appended claims.

Having thus described my invention, what I claim as new and desire to secure by Letters Patent is:—

1. In a lubricating system, a filter, a supply line for said filter, a discharge line therefor, said supply line communicating with said discharge line and means responsive to changes of temperature and pressure in said supply line for controlling communication between said supply and discharge lines.

2. In a lubricating system, a filter, a supply line for said filter, a discharge line therefor, said supply line communicating with said discharge line, a valve controlling the communication between said supply and discharge lines and means responsive to temperature and pressure in said supply line for operating said valve.

3. In a lubricating system, a filter, a supply line for said filter, a discharge line therefor, said supply line communicating with said discharge line, a valve for controlling communication between said supply line and said discharge line and means in said supply line for operating said valve, said means being responsive to temperature over a definite range and responsive to pressure in the supply line at temperatures above the upper limit of said range.

4. In a lubricating system, a filter, a supply line for said filter, a discharge line therefor, said supply line communicating with said discharge line, a valve for controlling communication between said supply and discharge lines, a bellows device in said supply line operatively connected to said valve and a charge of volatile liquid in said bellows device whereby the operation of said valve is responsive to changes of pressure and temperature in said supply line.

5. In a lubricating system, a filter, a supply line for said filter, a dischage line therefor, said supply line communicating with said discharge line, a valve controlling communication between said supply and discharge lines, a bellows device in said supply line operatively connected to said valve and a charge of a volatile liquid in said bellows device capable of exerting, when completely vaporized, a pressure slightly greater than the normal oil pressure in the system.

6. In a lubricating system, a filter, a supply line for said filter, a discharge line therefor, said supply line communicating with said discharge line, a valve controlling communication between said supply and discharge lines, a bellows device in said supply line operatively connected to said valve and a charge of volatile fluid in said bellows device, said liquid having a vapor pressure when completely vaporized slightly greater than the normal pressure within the system whereby said bellows is responsive to temperature changes below the vaporizing temperature of said liquid and responsive to pressure changes above the vaporizing temperature of said liquid.

7. In a lubricating system, a filter, a supply line for said filter, a discharge line therefor, said supply line communicating with said discharge line, a valve controlling communication between said supply and discharge lines and controlling means for said valve, said controlling means being responsive to both pressure and temperature through a definite range of temperature and to pressure only above the upper limit of said temperature range.

8. In a lubricating system, a filter, a supply line for said filter, a discharge line therefor, a chamber in said supply line having a port communicating with said discharge line, a valve controlling said port, and means in said chamber responsive to temperature and pressure for operating said valve.

9. In a lubricating system, a filter, a supply line for said filter, a discharge line therefor, a chamber in said supply line having a port communicating with said discharge line, a valve controlling said port and means for operating said valve, said means being responsive to temperature over a definite range and responsive to pressure at temperatures above the upper limit of said range.

10. In a lubricating system, a filter, a supply line for said filter, a discharge line therefor, a chamber in said supply line having a port communicating with said discharge line, a valve controlling said port, a bellows device supported in said chamber and operatively connected to said valve and a charge of volatile liquid in said bellows device whereby the operation of said valve is responsive to changes of pressure and temperature in said supply line.

11. In a lubricating system, a filter, a supply line for said filter, a discharge line therefor, a chamber in said supply line having a port communicating with said discharge line, a valve controlling said port, a bellows device supported in said chamber and operatively connected to said valve and a charge of volatile liquid in said bellows device capable of exerting when completely vaporized a pressure slightly greater than a normal oil pressure in the system whereby said bellows device is responsive to temperature over a definite range and responsive to pressure at temperatures above the upper limit of said range.

12. In a lubricating system, a filter, a supply line for said filter, a discharge line therefor, a chamber in said supply line having a port communicating with said discharge line, a valve controlling said port, and a bellows thermostat supported in said chamber and operatively connected to said valve whereby the operation of said valve is responsive to changes of pressure and temperature in said supply line.

13. In a lubricating system, a filter, a supply line for said filter, a discharge line therefor, a by-pass between said supply line and discharge line, and means controlling said by-pass, said means being responsive both to temperature and pressure over a limited temperature range and to pressure only beyond the upper limit of said temperature range.

In testimony whereof, I have signed my name to this specification.

MARSHALL H. WARD.